July 24, 1956     M. L. COURTER     2,756,241
ETHYLENE OXIDE RECOVERY
Filed Nov. 2, 1953
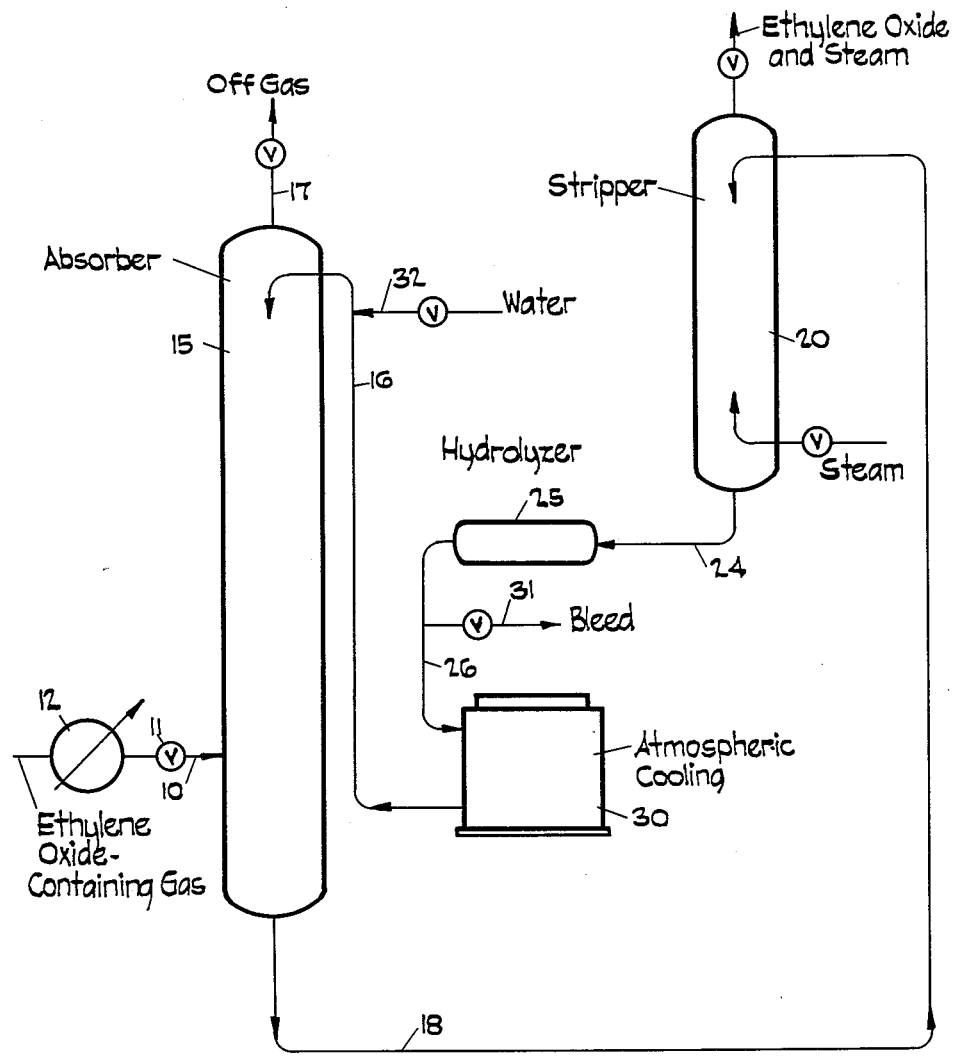
Inventor:
MARTIN L. COURTER
By   *Walter Mark*
His Agent United States Patent Office 2,756,241
Patented July 24, 1956

2,756,241
ETHYLENE OXIDE RECOVERY

Martin L. Courter, Walnut Creek, Calif., assignor to Shell Development Company, Emeryville, Calif., a corporation of Delaware Application November 2, 1953, Serial No. 389,593
4 Claims. (Cl. 260—348)

This invention relates to the recovery of olefin oxides from gaseous mixtures. The invention relates more particularly to the recovery of ethylene oxide from ethylene oxide-containing mixtures obtained by the direct oxidation of normally gaseous olefinic hydrocarbons comprising ethylene.

Ethylene oxide is obtained by the direct catalytic oxidation of normally gaseous olefinic hydrocarbons comprising ethylene. The mixtures resulting from the oxidation reaction, however, consist predominantly of normally gaseous materials, such as nitrogen, oxides of carbon, unconverted reactants comprising ethylene and oxygen, etc., and contain the desired ethylene oxide in only relatively minor amount. Often the ethylene oxide content of a reaction mixture obtained by the catalytic oxidation of ethylene-containing hydrocarbons will not substantially exceed an amount equal to about 2 to 3 percent by weight of the total reactor effluence.

The recovery of ethylene oxide in a practical scale operation from mixtures containing so large an excess of normally gaseous materials and so little of the desired product presents serious difficulties. It has been proposed heretofore to separate ethylene oxide from hydrocarbon oxidation products by selective absorption in a suitable solvent, such as water. In such an operation the ethylene oxide-containing mixture is contacted with water in an absorption zone, and absorbed ethylene is stripped from the fat aqueous solvent. This necessitates the use of relatively large amounts of water, particularly when at least the greater part of the ethylene oxide content of the mixture is to be recovered without conversion to ethylene glycol. The use of such large amounts of water necessitates the recycling of lean aqueous solvent from the stripping operation to the absorption zone. Although by far the most promising of the ethylene recovery methods proposed heretofore, selective absorption in water presents problems the consequences of which often militate against practical operation of the process. At least a substantial part of the difficulties are directly attributable to residual ethylene oxide in the lean aqueous solvent recycled from the stripping step to the ethylene absorber.

The lean solvent passing from the stripping operation to the absorber must be cooled to a temperature commensurate with practical scale operation of the absorption zone. The cooling of such substantial amounts of water in closed cooling systems of the type wherein the liquid being cooled is not in direct contact with the atmosphere, entails costs of initial installation and of operation the magnitude of which often renders the process economically unfeasible. The use in processes disclosed heretofore of far less costly types of cooling systems wherein liquid being cooled is in direct contact with the atmosphere is precluded because of the presence of small amounts of residual ethylene oxide in the lean solvent to be cooled. Because of the toxic nature of ethylene oxide its concentration in gaseous streams passing into the atmosphere must be kept below an exceedingly low amount, generally below about 0.01% by volume. The presence of ethylene oxide in the liquid to be cooled in an amount above about 0.003% by weight is generally too high to enable cooling in atmospheric type cooling equipment in the absence of pollution of the atmosphere. Even efficient practical scale stripping operations, particularly when substantial conversion of ethylene oxide to ethylene glycol is avoided, generally result in the obtaining of bottoms having a substantially higher ethylene oxide content. In a typical large scale operation the presence of an amount of ethylene oxide in the stripper bottoms of about 0.01% by weight is found to result in an ethylene oxide concentration of about 0.03% by volume in the air stream leaving the atmospheric cooling equipment in which these bottoms are cooled.

A further difficulty directly attributable to residual ethylene oxide in the stripper bottoms is the adverse effect upon efficiency of ultimate ethylene oxide recovery. Because of the relatively low ethylene oxide concentration in the mixture charged to the absorber, the presence of even the small amount of ethylene oxide generally encountered in the lean solvent leaving the stripper depresses materially the maximum recovery of ethylene oxide possible in the absorber under conditions of temperature and pressures commensurate with commercial scale operations.

It is an object of the present invention to provide an improved process enabling the more efficient recovery of ethylene oxide from admixture with normally gaseous materials having no appreciable solubility in water. A further object of the invention is the provision of an improved process enabling the more efficient recovery of ethylene oxide from ethylene oxide-containing mixtures obtained by direct oxidation with molecular oxygen of ethylene-containing hydrocarbons. Other objects and advantages of the present invention will become apparent from the following detailed description thereof, made with reference to the attached drawing wherein the single figure represents one form of apparatus capable of being used in carrying out the process of the invention.

In accordance with the process of the invention the recovery of ethylene oxide from a gaseous mixture containing ethylene oxide in admixture with normally gaseous materials, by a sequence of steps comprising separating ethylene oxide from said mixture by selective absorption in an aqueous solvent, stripping ethylene oxide from the resulting fat aqueous solvent, cooling the resulting lean solvent, and passing cooled lean solvent to the absorber, is enabled to proceed with substantially improved efficiency by maintaining the lean solvent at ethylene oxide hydrolyzing conditions for a sufficient length of time to bring about the conversion of at least the greater part of the residual ethylene oxide content thereof to ethylene glycol prior to said cooling of said lean solvent. In a specific embodiment of the present invention cooling of the lean solvent after said hydrolyzing conditions is carried out by atmospheric cooling in the substantial absence of any passage of ethylene oxide into the atmosphere.

The process of the invention may be applied broadly to the recovery of ethylene oxide from mixtures containing ethylene oxide in admixture with a substantial excess of normally gaseous components possessing no appreciable solubility in water. Such mixtures comprise, for example, those consisting predominantly of normally gaseous hydrocarbons and/or nitrogen and which contain ethylene oxide in relatively low concentrations. The process of the invention is applied with particular advantage to the recovery of ethylene oxide from the mixtures obtained by the direct oxidation of normally gaseous hydrocarbons comprising ethylene with molecular oxygen. The ethylene oxide-containing mixtures to the separation of which the process of the invention is applied include those obtained by oxidation of ethylene-containing hydrocarbon mixtures with oxygen, as such, or with oxygen-containing gases such as, for example, air.

In order to set forth more clearly the nature of the invention it is described in detail hereinafter with reference to the attached drawing in its application to the recovery of ethylene oxide from a mixture obtained by the oxidation of normally gaseous olefinic hydrocarbons comprising ethylene with air.

An ethylene oxide-containing mixture, obtained by the oxidation of normally gaseous hydrocarbons comprising ethylene with air in the presence of a silver-containing catalyst, and consisting predominantly of nitrogen, unconverted normally gaseous hydrocarbons comprising ethylene, oxygen, oxides of carbon, etc., and containing ethylene oxide in only a minor amount, for example, in the range of from about 1 to about 3%, is passed through line 10, containing valve 11, into an absorption zone. The absorption zone may comprise any suitable type of apparatus enabling contact of the normally gaseous ethylene oxide-containing charge with a solvent, such as, for example, an absorption column 15. Such absorption column may be provided with suitable trays, baffles, solid packing material or the like. An absorbent capable of selectively absorbing the ethylene oxide, such as, for example, water, emanating from within the system as described hereinbelow, is introduced into the upper part of column 15 by means of valved line 16. Conditions within column 15 are controlled to result in the selective absorption of ethylene oxide from the ethylene oxide-containing gases passing upward through the column countercurrent to the liquid aqueous solvent.

Suitable conditions to be maintained within column 15 comprise, for example, a temperature in the range of from about 5° C. to about 80° C., preferably from about 20° C. to about 40° C., and a pressure in the range of, for example, from about 50 to about 300 pounds. Maintenance of the desired conditions of temperature within column 15 is aided by the provision of suitable means to control the temperature of the gaseous feed entering column 15 through line 10, and of the aqueous solvent emanating through line 16. When the recovery operation is carried out in combination with a hydrocarbon oxidation reaction producing the ethylene oxide-containing gaseous stream treated in accordance with the invention, at least a substantial part of the total oxidation reactor effluence may be passed directly through line 10 into column 15. A cooler 12 is provided in line 10 to enable the reduction of the temperature of the ethylene oxide-containing charge from the reaction temperature to one conducive to the maintenance of desired temperature conditions within column 15. Other means not shown in the drawing may be resorted to to aid in maintaining the desired conditions within column 15.

Within column 15 selective absorption of ethylene oxide in water takes place resulting in the formation of a fat aqueous solvent containing ethylene oxide and of a gaseous fraction consisting predominantly of the normally gaseous materials other than ethylene oxide introduced into column 15, and consisting essentially of unconverted normally gaseous hydrocarbons, nitrogen, oxides of carbon, oxygen, etc. The gaseous fraction is eliminated from column 15 through valved line 17. The gaseous fraction thus passed through line 17 may be passed in part or in its entirety to a hydrocarbon oxidation zone producing ethylene-oxide containing reaction products.

The fat solvent is withdrawn from column 15 and passed through line 18 into a suitable stripping zone comprising, for example, a stripping column 20. Within stripping column 20 conditions are maintained resulting in the stripping of ethylene oxide from the fat solvent. The suitable conditions may be obtained, for example, by injection of steam into the lower part of stripping column 20, by means of valved lines 21, under conditions resulting in the formation of a column overhead consisting essentially of ethylene oxide and steam.

Conditions within stripping column 20 are controlled to avoid the conversion of any substantial amount of ethylene oxide to ethylene glycol during the stripping operation within column 20. Although the stripping operation may be carried out at subatmospheric, atmospheric or superatmospheric pressures in accordance with the process of the invention it is preferred to effect the stripping operation at a slightly elevated pressure, for example, in the range of from about 20 to about 80 pounds absolute.

The overhead leaving column 20 is passed through valved line 23 to suitable ethylene oxide concentrating means not shown in the drawing. In column 20 at least a substantial part of the ethylene oxide will be stripped from the aqueous fat solvent charged thereto, leaving lean solvent devoid of any substantial amount of ethylene oxide as bottoms. However, under even the most carefully controlled conditions prevailing in practical scale stripping operations the ethylene oxide content of such lean stripped solvent will be in excess of that permitting the application of atmospheric cooling to the stream or enabling the attainment of the maximum potential recovery of ethylene oxide in the absorber therewith. Thus, stripper bottoms obtained during commercial stripping operations often have an ethylene oxide content ranging, for example, from about 0.01 to about 0.05% by weight.

Lean aqueous solvent free of any substantial amount of ethylene oxide is withdrawn from the lower part of column 20, cooled and recycled to an upper part of absorption column 15. In accordance with the process of the invention substantially all remaining residual ethylene oxide in the lean solvent is converted to ethylene glycol prior to cooling and prior to recycling the solvent to the absorption column 15.

Conversion of residual ethylene oxide in the lean solvent to glycol is obtained by maintaining the lean solvent in a hydrolyzing zone at an elevated temperature. The hydrolyzing zone may comprise, for example, a chamber 25. Lean solvent is withdrawn from stripping column 20 and passed through line 24 into chamber 25. Within chamber 25 the lean solvent is maintained at an elevated temperature for a sufficient length of time to assure the conversion of at least the greater portion of ethylene oxide contained in the lean solvent to glycol. The maintenance of a temperature in the range of, for example, from about 125° C. to about 250° C., and preferably from about 150° C. to about 200 C., within chamber 25 is satisfactory. The time of residence of the lean solvent in chamber 25 will vary in accordance with the specific temperature maintained in the hydrolyzing zone. In general a time not substantially in excess of about fifteen minutes is sufficient to obtain a conversion of at least a substantial part of the residual ethylene oxide to the glycol. A residence time in chamber 25 in the range of, for example, from about 10 to about 20 minutes is satisfactory. A longer residence time within chamber 25 may, however, be resorted to within the scope of the invention. Pressures within chamber 25 are preferably maintained in the range of, for example, from about 30 to about 250 pounds absolute. Higher or lower pressures may however, be used within the scope of the invention.

Means not shown in the drawing may be provided to maintain the desired temperature conditions within chamber 25. An advantage of the invention resides in the ability to effect the desired hydrolysis of the residual ethylene oxide to glycol in chamber 25 without further heat than the latent heat content of the lean solvent stream emanating from column 20. Chamber 25 is preferably provided with suitable insulating means to prevent the loss by radiation of any substantial quantity of heat therefrom. The use of additional means not shown in the drawing may, however, be resorted to within the scope of the invention to maintain the contents of chamber 25 within the prescribed temperature range. Conditions, within chamber 25 are preferably controlled to reduce the residual ethylene content of the lean solvent stream treated therein below about 0.003% by weight and preferably below about 0.001% by weight.

The invention is in no wise limited to the utilization of a hydrolyzer of any specific type as the hydrolyzing zone. Thus, a suitable hydrolyzing zone may be obtained by the provision of a suitable "hold-up section" in column 20, below the point of introduction of the stripping steam. Such a "hold-up section" may be separated from the stripping section proper of column 20 by provision of a suitable barrier between these sections, such as, for example, one or more plates, baffles or the like. The "hold-up section" is of sufficient size to assure the retention therein of the stripped solvent for a residence time comensurate with the substantially complete conversion of residual ethylene oxide to the ethylene glycol.

Lean aqueous solvent, now substantially free of ethylene oxide, is passed from hydrolyzer 25 through line 26 to a suitable cooling zone. An important advantage of the invention resides in the ability to employ atmospheric cooling, since the ethylene oxide content of the stream to be cooled is now well below that capable of resulting in pollution of the atmosphere. The atmospheric cooling zone may comprise, for example, a conventional type of cooling tower wherein the hot aqueous solvent is cooled by direct contact with the atmosphere, illustrated diagrammatically in the drawing by the element 30. Although but one such cooling tower is indicated in the drawing it is to be understood that the invention is in no wise limited in the number of types of atmospheric cooling systems employed during the cooling of the recycled aqueous solvent in the process of the invention. A valved line 31 is provided to bleed a portion of the lean solvent from the system. During the cooling operation in atmospheric cooler 30 the temperature of the lean solvent is reduced to that essential to the maintenance of the prescribed temperature conditions within absorber column 15. Cooled lean aqueous solvent is drawn from atmospheric cooler 30 through valved line 16 into the upper part of column 15 to function therein as the aqueous solvent referred to above. A valved line 32 leading into line 16 is provided for the introduction of make-up water into the system from an outside source.

The efficiency with which ethylene oxide is recovered from dilute gaseous mixtures in accordance with the invention is evidenced by the following example:

*Example*

In an operation "A," an ethylene oxide-containing gaseous mixture, obtained by the catalytic oxidation of ethylene-containing normally gaseous hydrocarbons with air, which mixture contained 2.2 parts of ethylene oxide and 35 parts of nitrogen, the rest of the mixture consisting essentially of methane, ethane, oxides of carbon ethylene and argon, is passed through an absorption column countercurrent to a liquid aqueous solvent consisting essentially of water. The aqueous solvent employed as liquid absorbent in the absorption column emanates within the system as described below. 99% of the ethylene oxide contained in the gaseous charge to the absorption column is absorbed by the aqueous solvent resulting in a fat solvent consisting essentially of 1.3% ethylene oxide and 97% water. Ethylene oxide is stripped from the fat solvent by steam stripping in a stripping column at 50 pounds pressure. The resulting stripper overhead consists essentially of ethylene oxide and steam in the ratio of ethylene oxide to steam of 65:28 parts by weight. Lean solvent, formed as stripper bottoms, contained 0.01% ethylene oxide. After the stripping operation the lean solvent is maintained at a temperature of 300° F. for a period of 15 minutes. After the heating period the lean solvent is found to contain no determinable amount of ethylene oxide. After the heating step the lean solvent is cooled to a temperature of 83° F. by atmospheric cooling obtained by passing the lean solvent consecutively through an atmospheric cooler of the Fin Fan type and a tower type cooler. The resulting cooled lean solvent is introduced into the upper part of the absorber column to function therein as the liquid aqueous absorbing medium referred to above. The atmospheric air streams leaving the atmospheric coolers contain no determinable amount of ethylene oxide.

When repeating the above operation "A" under substantially identical conditions, but with the exception that the lean solvent, which has an ethylene oxide content of 0.01% by weight is passed from the stripper directly to the atmospheric cooler, atmospheric air emanating from the cooler is found to have an ethylene oxide content of 0.03% volume.

When repeating the operation "A" substantially as described hereinbefore, but with the exception that the lean solvent is passed directly from the stripper bottom to a closed cooling system, cooled therein to 83° F. and passed to the absorber column to function as the absorbent therein, the ethylene oxide recovery in the absorption column was only 97%.

The invention claimed is:

1. In a process for the separation of ethylene oxide from a gaseous mixture containing ethylene oxide in admixture with normally gaseous components having no appreciable solubility in water by a sequence of steps comprising, the separation of ethylene oxide from said mixture by selective absorption in an aqueous absorbent, stripping ethylene oxide from the resulting fat aqueous absorbent, thereby leaving a lean aqueous absorbent containing residual amounts of ethylene oxide, cooling said lean absorbent, and passing said lean absorbent to said absorption, the improvement which comprises carrying out said stripping at a pressure of from about 20 to about 80 lbs. absolute without converting any substantial amount of ethylene oxide to ethylene glycol, maintaining said lean absorbent at a temperature of from about 125° to about 250° C. at a pressure of from about 30 to about 250 lbs. absolute for a period of time of from about 10 to about 20 minutes, thereby converting at least a substantial part of said residual ethylene oxide to ethylene glycol and effecting said cooling of said lean absorbent by direct contact with the atmosphere.

2. In a process for separating ethylene oxide from a gaseous mixture containing ethylene oxide in admixture with normally gaseous hydrocarbons by a sequence of steps comprising, separating ethylene oxide from said mixture by selective absorption in an aqueous solvent, stripping ethylene oxide from the resulting fat aqueous solvent, thereby leaving lean aqueous solvent containing residual ethylene oxide, cooling said lean solvent, and passing said cooled lean solvent to said absorption, the improvement which comprises carrying out said stripping at a pressure of from about 20 to about 80 lbs. absolute without forming any substantial amount of ethylene glycol, heating said lean aqueous solvent at a temperature of from about 125° C. to about 250° C. and at a pressure of from about 30 to 250 lbs. absolute and effecting said cooling of said lean solvent by direct contact with the atmosphere.

3. The process in accordance with claim 2 wherein said heating of said lean solvent is carried out at a temperature in the range of from about 150° C. to about 200° C.

4. The process in accordance with claim 2 wherein said heating of said lean solvent is continued until the ethylene oxide content of the resulting heated lean solvent is less than about 0.003% by weight.

References Cited in the file of this patent

UNITED STATES PATENTS

| 2,135,271 | Balcar | Nov. 1, 1938 |
| 2,169,210 | Balcar | Aug. 15, 1939 |

FOREIGN PATENTS

| 533,054 | Great Britain | 1941 |
| 558,618 | Great Britain | 1944 |